United States Patent
Paßmann et al.

(10) Patent No.: US 10,155,644 B2
(45) Date of Patent: Dec. 18, 2018

(54) CRANE GIRDER FOR A CRANE, IN PARTICULAR FOR AN OVERHEAD OR GANTRY CRANE, AND A CRANE COMPRISING SUCH A GIRDER

(71) Applicant: Konecranes Global Corporation, Hyvinkää (FI)

(72) Inventors: Christoph Paßmann, Dortmund (DE); Richard Kreisner, Ennepetal (DE); Thomas Schlierbach-Knobloch, Herdecke (DE); Stefan Noll, Burscheid (DE); Franz Schulte, Herdecke (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 15/313,314

(22) PCT Filed: May 21, 2015

(86) PCT No.: PCT/EP2015/061291
§ 371 (c)(1),
(2) Date: Nov. 22, 2016

(87) PCT Pub. No.: WO2015/177292
PCT Pub. Date: Nov. 26, 2015

(65) Prior Publication Data
US 2017/0144867 A1    May 25, 2017

(30) Foreign Application Priority Data

May 23, 2014   (DE) .......................... 10 2014 107 323

(51) Int. Cl.
*B66C 6/00*    (2006.01)
*F16B 7/18*    (2006.01)
*B66C 17/00*   (2006.01)

(52) U.S. Cl.
CPC ............... *B66C 6/00* (2013.01); *F16B 7/18* (2013.01); *B66C 17/00* (2013.01)

(58) Field of Classification Search
CPC .............. B66C 6/00; B66C 17/00; F16B 7/18
(Continued)

(56) References Cited

U.S. PATENT DOCUMENTS

| | | | |
|---|---|---|---|
| 499,622 A | 6/1893 | Weickel | |
| 2,146,540 A | * 2/1939 | Burke | ...................... E04C 3/09 |
| | | | 52/693 |

(Continued)

FOREIGN PATENT DOCUMENTS

| | | |
|---|---|---|
| CN | 102219007 A | 10/2011 |
| CN | 202766132 U | 3/2013 |

(Continued)

OTHER PUBLICATIONS

International Search Report of the International Searching Authority from corresponding Patent Cooperation Treaty (PCT) Application No. PCT/EP2015/061291, dated Jul. 7, 2015.

(Continued)

*Primary Examiner* — Patrick J Maestri
*Assistant Examiner* — Joseph J. Sadlon
(74) *Attorney, Agent, or Firm* — Gardner, Linn, Burkhart & Ondersma LLP

(57) ABSTRACT

A crane girder for a crane, such as an overhead or gantry crane, that is configured as a trussed girder with an upper chord, a lower chord, and braces connecting the chords to each other. At least one of the braces is designed flatly and has a main surface which extends transversely to a longitudinal direction of the crane girder. The brace is removably secured to the upper chord and/or the lower chord.

21 Claims, 5 Drawing Sheets

(58) Field of Classification Search
USPC .................................................. 52/693; 212/347
See application file for complete search history.

(56) References Cited

U.S. PATENT DOCUMENTS

| | | | | | |
|---|---|---|---|---|---|
| 2,500,718 | A | | 3/1950 | Turner | |
| 2,860,743 | A | * | 11/1958 | William | E04C 3/08 403/230 |
| 3,294,252 | A | | 12/1966 | Hosoi et al. | |
| 3,793,790 | A | * | 2/1974 | Love | E04C 3/40 52/393 |
| 3,826,057 | A | * | 7/1974 | Franklin | E04C 3/08 52/641 |
| 4,102,108 | A | * | 7/1978 | Cody | E04B 1/24 403/156 |
| 4,546,591 | A | * | 10/1985 | Beltz | E04C 3/08 52/645 |
| 4,580,780 | A | * | 4/1986 | Gautraud | A63D 1/00 473/115 |
| 4,660,346 | A | * | 4/1987 | Burger | E04C 3/08 52/651.11 |
| 5,443,151 | A | * | 8/1995 | Taylor | B65G 21/22 104/109 |
| 5,598,784 | A | * | 2/1997 | Kubsik | B65G 21/06 104/107 |
| 6,698,152 | B1 | * | 3/2004 | Bush | E04B 5/12 52/650.1 |
| 6,701,688 | B2 | * | 3/2004 | Matiere | E04C 5/064 52/649.2 |
| 7,587,877 | B2 | * | 9/2009 | Strickland | B21D 47/01 52/634 |
| 7,707,795 | B2 | * | 5/2010 | Yu | E04B 2/7422 403/402 |
| 8,037,658 | B2 | * | 10/2011 | Kundel, Sr. | B66C 7/08 52/283 |
| 8,919,258 | B2 | * | 12/2014 | Spies | B66C 7/08 104/89 |
| 9,751,730 | B2 | * | 9/2017 | Paβmann | B66C 19/00 |
| 2003/0014938 | A1 | | 1/2003 | Deschenes | |
| 2011/0180507 | A1 | | 7/2011 | Givens | |
| 2013/0167750 | A1 | * | 7/2013 | Spies | B66C 7/08 104/93 |
| 2014/0318075 | A1 | * | 10/2014 | Shuhaibar | E04B 1/24 52/712 |
| 2016/0264384 | A1 | * | 9/2016 | Roodenburg | B66C 23/70 |

FOREIGN PATENT DOCUMENTS

| | | |
|---|---|---|
| DE | 843424 C | 7/1952 |
| DE | 1919256 U | 7/1965 |
| DE | 1907455 A1 | 10/1969 |
| DE | 202010004971 U1 | 9/2010 |
| DE | 102012102808 A1 | 10/2013 |
| GB | 2038393 A | 7/1980 |
| GB | 2448297 A | 10/2008 |
| JP | S49148650 U | 12/1974 |
| JP | 2002005138 A | 1/2002 |
| JP | 2007223699 A | 9/2007 |
| WO | 2013144314 A1 | 10/2013 |

OTHER PUBLICATIONS

Written Opinion of the International Searching Authority from corresponding Patent Cooperation Treaty (PCT) Application No. PCT/EP2015/061291, indicated completed on Nov. 26, 2015.

Preliminary Report on Patentability of the International Searching Authority in English from corresponding Patent cooperation Treaty (PCT) Application No. PCT/EP2015/061291, completed Nov. 29, 2016.

* cited by examiner

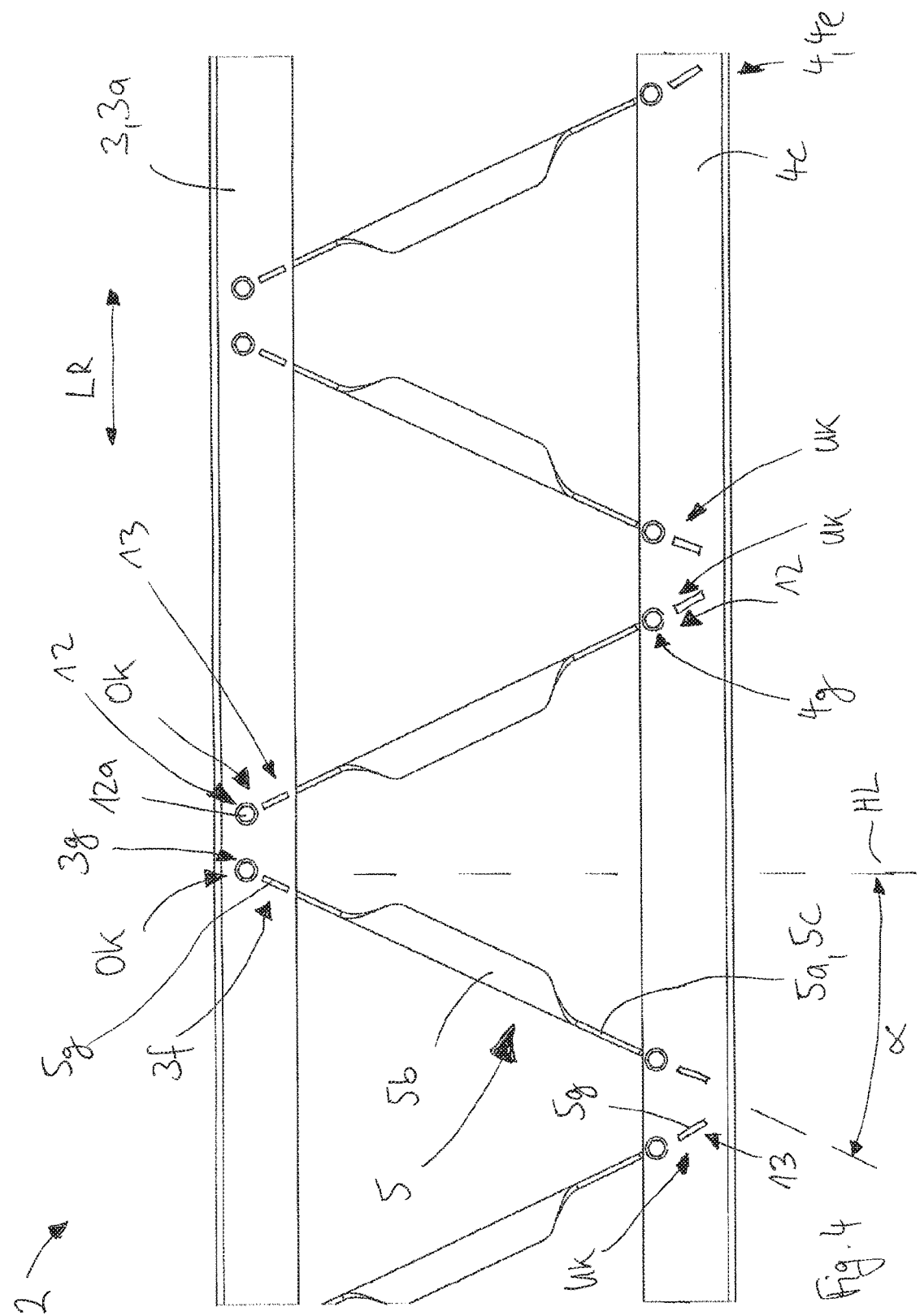

CRANE GIRDER FOR A CRANE, IN PARTICULAR FOR AN OVERHEAD OR GANTRY CRANE, AND A CRANE COMPRISING SUCH A GIRDER

CROSS REFERENCE TO RELATED APPLICATIONS

The present application claims the priority benefits of International Patent Application No. PCT/EP2015/061291, filed May 21, 2015, and claims benefit of DE 102014107323.1, filed on May 23, 2014.

BACKGROUND OF THE INVENTION

The invention relates to a crane girder for a crane, in particular for an overhead or gantry crane, said crane girder being designed as a trussed girder with an upper chord, a lower chord and braces connected said chords to one another, wherein at least one of the braces is designed in a flattened manner and has a main surface which extends transversely to a longitudinal direction of the crane girder.

The invention also relates to a crane, in particular an overhead crane or a gantry crane, comprising at least one such crane girder.

An overhead crane comprising a crane girder designed as a trussed girder is known from German laid-open document DE 10 2012 102 808 A1. The crane girder comprises an upper chord and a lower chord which are connected to one another by means of braces which are designed in a flattened manner. The braces each have a main surface extending transversely to a longitudinal direction of the crane girder and are welded with their mutually opposite ends to the upper chord and the lower chord.

German utility model document DE 1 919 256 U discloses a crane girder which is designed as a trussed girder and whose braces are designed in the shape of rods and are screwed to the lower chord. Such a crane girder is also disclosed in US 2011/0180507 A1.

A trussed girder comprising braces which are designed in a flattened manner and which are screwed to the lower chord or the upper chord is known from German laid-open document DE 1 907 455 A. The trussed girder is not a crane girder.

Furthermore, a supporting structure, designed as a trussed girder, of a bridge comprising screwed, rod-shaped braces is known from German patent document DE 843 424 B.

SUMMARY OF THE INVENTION

The object of the invention is to provide an improved crane girder for a crane, in particular for an overhead or gantry crane, which is particularly easy to produce. Also, the object of the invention is to provide a crane comprising an improved crane girder.

In accordance with one aspect of the present invention, a crane girder for a crane, in particular for an overhead or gantry crane, may be designed as a trussed girder with an upper chord, a lower chord, and braces connecting the chords to one another. At least one of the braces is designed in a flattened manner, so as to provide a flattened brace that has a main surface extending transversely to a longitudinal direction of the crane girder. Such a crane girder may be improved in an advantageous manner by virtue of the fact that the brace may be detachably fastened to the upper chord and/or the lower chord. As a result, individual modules and assemblies of the crane girder can be prefabricated and transported prior to assembly in a space-saving manner and thus in a simple and cost-effective manner to the place of installation. Therefore, in contrast to crane girders comprising conventional, non-detachable connections, the crane girder can be assembled in a particularly simple manner at the place of installation and comparatively expensive factory manufacture and complex transportation can be avoided. It is also possible to avoid welded connections which are complex to produce.

In this case, braces are considered generally to be those elements of a trussed construction which have an oblique or diagonal extent. As a result, the braces of a trussed construction differ from the elements which extend exclusively vertically and are defined as posts.

By means of a corresponding flattened configuration, the braces or surface braces preferably absorb forces in the direction of their longitudinal axis and thus in the extension plane of their planar main surface. Such surface elements or surface support structures may be defined in engineering mechanics as disks, whereas surface elements which are loaded perpendicularly to their extension plane or main surface may be defined as plates. Disks and thus also the surface braces in accordance with the invention may differ e.g. from rods or rod-shaped posts and braces in that their thickness dimensions are substantially less than the length and width dimensions, which determine the two-dimensional extent of the disk. Accordingly, flattened braces can also be defined as surface braces or disk braces.

Moreover, the crane girders produced with flattened braces as trussed girders may have a considerably reduced weight as well as an optimised load-bearing capacity by reason of the omission of structurally unnecessary metal sheet regions and a material saving associated therewith.

The brace may be fastened to the upper chord and/or the lower chord via the main surface. By incorporating the main surface into the fastening of the brace, the force flow and the buckling strength of the brace can be optimised with regard to the membrane joints, which are formed outside of the webs of the upper chord or lower chord. In this case, the brace may be fastened to a web of the upper chord and/or the lower chord and the web extends preferably vertically in relation to the longitudinal direction of the crane girder. The brace may be fastened in a form-fitting and/or force-fitting manner, and as a result, the crane girder can be assembled and disassembled in a particularly simple manner.

According to yet another aspect of the present invention, the brace may be fastened by means of a screw-connection. Such a screw connection may be arranged at least partially within a plane formed by the main surface and preferably has a screw-in direction in parallel with the main surface. Furthermore, the screw connection may include at least one screw, a sleeve fastened to the main surface and a nut. The brace may then be fastened to the upper chord and the lower chord by means of the screw which is guided through a screw passage of the upper chord and of the lower chord and the sleeve, and the nut which is supported on the sleeve and is designed preferably as a press nut. An easily produced and rotationally fixed, detachable fastening of the brace to the upper chord or lower chord can be achieved in this manner.

In an advantageous manner, the screw connection may additionally include a clamping pin, through which the screw is guided and on which the upper chord or the lower chord is supported. The clamping pin may relieve the screw connection, in particular the screw thereof, in terms of lateral forces and shear forces which occur.

The main surface of the brace may have at least one aperture, against the edge of which the peripheral surface of the sleeve lies and is fastened, preferably welded, soldered or adhered. The aperture facilitates the positioning of the sleeve on the brace before the sleeve and the brace are fastened to one another preferably by producing the welded, soldered or adhesive connection. Moreover, the manufacturing complexity can be reduced because in the case of braces produced from sheet steel the apertures can be produced in a particularly simple manner by laser cutting.

In a particularly advantageous manner, provision may also be made that the brace is fastened by means of a plug-in connection. This substantially facilitates assembly because the braces can be positioned in a form-fitting manner in a desired fastening position relative to the lower chord or upper chord. Once the plug-in connection, which serves as a positioning aid, has been produced, the fastening position can be releasably locked in a simple manner, e.g. by means of the aforementioned screw connection. Furthermore, the plug-in connection may have a plug-in direction in parallel or generally parallel alignment with the main surface. The plug-in connection may be produced directly between the main surface and the upper chord or the lower chord, in particular by at least one plug-in shoulder of the main surface that is inserted into a plug-in receiver of the upper chord or into a plug-in receiver of the lower chord. In this case, the braces may be oriented with respect to the lower chord or upper chord in a particularly simple manner by pushing-in or inserting the plug-in shoulders of the braces into the corresponding plug-in receivers of the lower chord or upper chord, whereby they engage and are brought into abutment with one another. As a consequence, the relative position of the lower chord or upper chord with respect to the braces can be fixed in a simple manner in rotational and in translational terms.

Moreover, in an advantageous manner, provision may be made that the upper chord and the lower chord are additionally connected to one another by means of a plurality of posts arranged in the longitudinal direction of the crane girder. This particularly effectively reduces the risk of buckling of the upper chord or the lower chord. This also increases the load-bearing capacity of the crane girder.

In a structurally simple manner, provision may be made that the upper chord and the lower chord are connected to one another exclusively in a detachable manner.

In accordance with an aspect of the present invention, a crane, in particular an overhead or gantry crane, comprising at least one crane girder which extends horizontally in a longitudinal direction may be advantageously improved by virtue of the fact that the crane girder may be designed in accordance with one of the advantageous embodiments above.

These and other objects, advantages, purposes, and features of the present invention will become apparent upon review of the following specification in conjunction with the drawings.

BRIEF DESCRIPTION OF THE DRAWINGS

FIG. 4 shows a side view of sections of the crane girder shown in FIG. 2.

DESCRIPTION OF THE PREFERRED EMBODIMENTS

Figure 1:
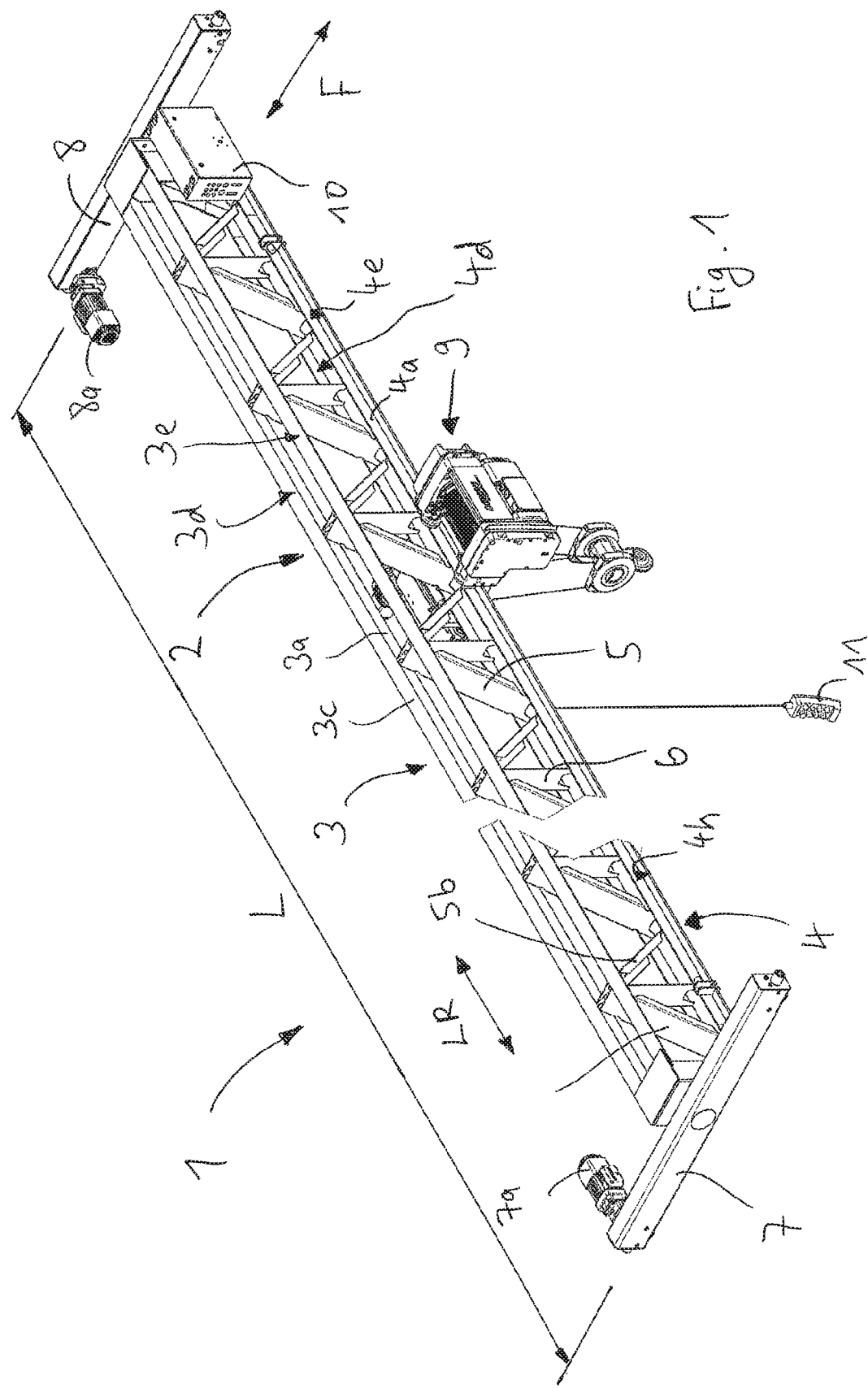
FIG. 1 shows an overhead crane which is designed as a single-girder crane and comprises a crane girder in accordance with the invention.

FIG. 1 shows a crane 1 which is designed as a single-girder overhead crane. The crane 1 comprises a crane girder 2 which is designed as a trussed girder and is oriented horizontally and extends with a length L in its longitudinal direction LR.

Of course, the crane 1 can also be designed as a single-girder gantry crane comprising a corresponding crane jib 2. Likewise, the crane 1 can be designed as a double-girder overhead crane or as a double-girder gantry crane and can comprise in a corresponding manner two crane girders 2. The explanations given hereinafter with reference to the crane 1 designed as a single-girder overhead crane can be applied accordingly.

The crane girder 2 of the crane 1 forms, together with first and second running gear units 7, 8 fastened to its mutually opposite ends, a crane bridge which in plan view is substantially double-T-shaped. By means of the running gear units 7, 8 the crane 1 is movable on rails, not illustrated, in a horizontal direction of travel F transversely to the longitudinal direction LR of the crane girder 2. The rails are typically situated above a ground surface and for this purpose can be elevated, e.g. by means of a suitable support structure or can be fastened to opposite walls of a building. In order to move the crane 1 or its crane girder 2, the first running gear unit 7 is driven by a first electric motor 7a and the second running gear unit 8 is driven by a second electric motor 8a. Suspended from the crane girder 2 is a crane trolley 9 which comprises a lifting gear designed as a cable winch and is movable by means of running gear units, not illustrated, transversely to the direction of travel F of the crane 1 and in the longitudinal direction LR of the crane girder 2. The crane trolley 9 is movable along and on laterally protruding running surfaces 4h of a lower chord 4 of the crane girder 2. The crane 1 also comprises a crane controller 10 and a pendant control switch 11 associated therewith, by means of which the crane 1 or the electric motors 7a, 8a and the crane trolley 9 comprising the cable winch can be activated and operated separately from one another.

The trussed construction of the crane girder 2 comprises substantially an upper chord 3, a lower chord 4 and braces 5 which extend diagonally therebetween and fixedly connect the upper chord 3 to the lower chord 4. As illustrated in FIG. 1, a plurality of posts 6 can additionally be provided between the upper chord 3 and the lower chord 4, said posts being arranged in the longitudinal direction LR of the crane girder 2, extending vertically and likewise fixedly connecting the upper chord 3 and the lower chord 4 to one another.

Figure 2:
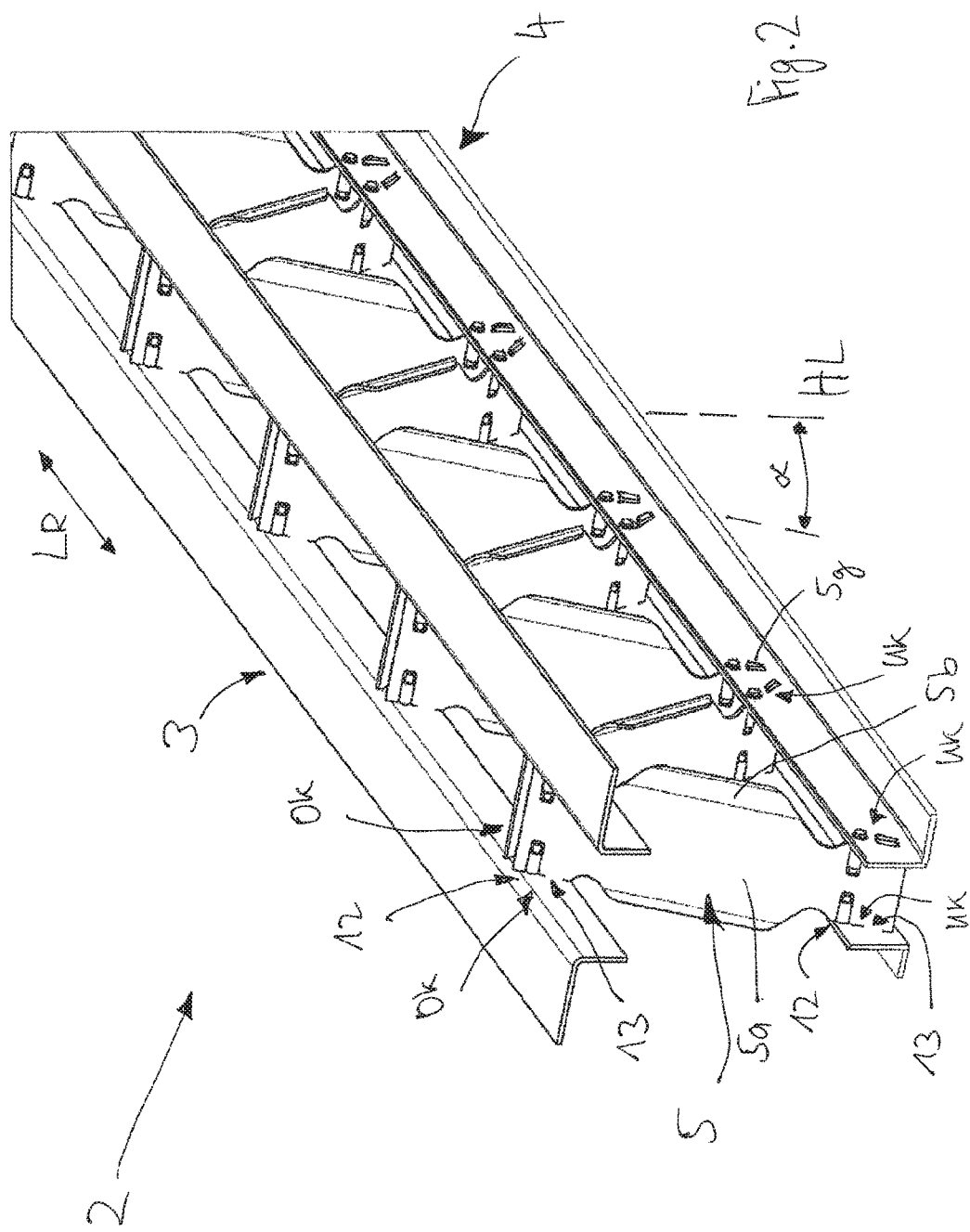
FIG. 2 shows a perspective view of the crane girder shown in FIG. 1.
Figure 3:
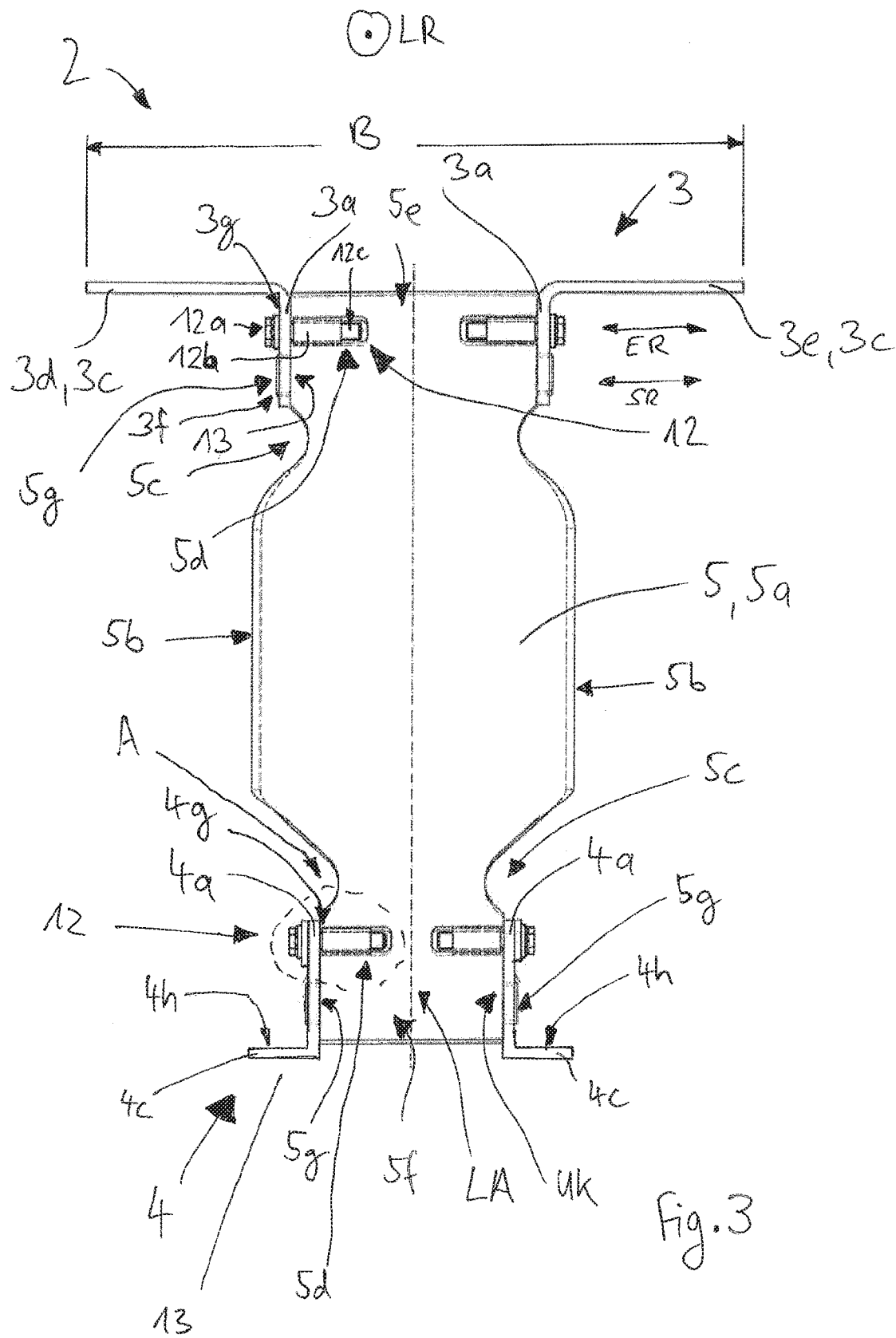
FIG. 3 shows a cross-sectional view of the crane girder shown in FIG. 2.

For the sake of simplicity, the present invention will be explained substantially with reference to the fastening of the braces 5 to the upper chord 3 or the lower chord 4. Therefore, the crane girder 2 is illustrated in FIGS. 2 to 4 without posts 6 and only with braces 5. However, the invention is not limited to the fastening of braces 5 to the upper chord 3 or lower chord 4, but instead relates in the same manner to the fastening of posts 6, which may be provided, to the upper chord 3 or lower chord 4 and can be applied accordingly thereto.

The upper chord 3 and the lower chord 4 extend spaced apart from one another and in parallel in the longitudinal direction LR of the crane girder 2 between the running gear units 7, 8. In this case, the upper chord 3 and the lower chord 4 are vertically spaced apart from one another. The upper chord 3 is composed of two first and second upper chord profiles 3d, 3e which are arranged in a horizontal plane and are horizontally spaced apart from another. The two upper chord profiles 3d, 3e are formed by an L-shaped or angle profile girder which in each case comprises a vertical web 3a and a horizontal flange 3c arranged at a right-angle thereto. In this case, the flanges 3c of the upper chord profiles 3d, 3e lie preferably in a horizontal plane with an upper end face of the brace 5. The lower chord 4 is composed, in a similar manner to the upper chord 3, of a first lower chord profile 4d and a second lower chord profile 4e which likewise are designed in each as an L-shaped or angle profile girder and accordingly comprise a vertical web 4a and a flange 4f arranged at a right-angle thereto. In this case, the flanges 4c of the lower chord 4 form the running surfaces 4h for the crane trolley 9. The downwardly directed webs 3a of the upper chord profiles 3d, 3e of the upper chords 3 and the upwardly directed webs 4a of the lower chord profiles 4d, 4e of the lower chords 4 face towards one another.

However, the lower chord profiles 4d, 4e do not have to be designed as L-shaped or angle profile girders, as in FIG. 1. It is likewise feasible for the lower chord 4 of the crane girder 2 to be formed not by two separate lower chord profiles 4d, 4e but rather by a single flat profile 4b comprising two perpendicular webs 4a. Accordingly, in the case of such a flat profile 4b which has an approximately U-profile-shaped cross-section, only one common flange 4f is provided which is extended laterally beyond the webs 4a. In this case, the mutually opposite ends of the flange 4f then form the running surfaces 4h. In the same manner, the upper chord 3 can also be formed by a corresponding flat profile 3b.

The upper chord 3 and the lower chord 4 of the crane girder 2 illustrated in FIG. 1 are fixedly and detachably connected to one another by means of in each case flattened braces 5 and posts 6. In this case, the braces 5 are designed as a metal sheet profile comprising a main surface 5a having a substantially planar and rectangular cross-section, wherein their longitudinal sides are folded back in the form of secondary surfaces 5b in order to increase buckling strength at least in a central region. The braces 5 are arranged within the trussed construction of the crane girder 2 between the webs 3a, 4a of the upper chord 3 or lower chord 4 and in this case are oriented in such a manner that in each case their main surface 5a extends transversely to the longitudinal direction LR of the crane girder 2. Therefore, as seen transversely to the longitudinal direction LR of the crane girder 2, only one brace 5 (or optionally one post 6) is ever provided between the webs 3a of the upper chord 3 or the webs 4a of the lower chord 4.

The design of the braces 5 will be described in detail hereinafter with reference to FIG. 3. The structural design of the optionally provided, flattened posts 6 which are likewise designed as a metal sheet profile corresponds, with correspondingly adapted dimensions, substantially to the design of the flattened braces 5, and therefore the description thereof including the reference signs 5a to 5g mentioned in this case can be applied accordingly.

FIG. 2 shows a perspective view of an end of the crane girder 2. The crane girder 2 is designed as a trussed girder whose upper chord 3 and lower chord 4 are composed in each case of two upper chord profiles 3d, 3e and lower chord profiles 4d, 4e respectively. The lower chord profiles 4d, 4e are designed as hollow profiles, as described above. The braces 5 which connect the upper chord 3 and the lower chord 4 are arranged, as seen in the longitudinal direction LR, in pairs and in pitched-roof fashion. In this case, each brace 5 is inclined at a setting angle α with respect to a notional vertical auxiliary plane (see also FIG. 4), which extends at a right-angle to the upper chord 3 and lower chord 4 extending in parallel in the longitudinal direction LR. In this case, the setting angle α is formed by the planar main surface 5a of the first brace 5 and the auxiliary plane. For the sake of simplicity, the setting angle α is indicated between the main surface 5a and an auxiliary line HL which lies in the auxiliary plane. Preferably, the setting angle α is in a range of 35 degrees to 55 degrees and particularly preferably is 45 degrees. Preferably, an even number of braces 5 is used, said braces being arranged accordingly in pairs and in pitched-roof fashion obliquely or diagonally with respect to one another, so that, as seen over the length L, the first or last brace 5 begins or ends at the lower chord 4 (see FIG. 1). In order to be able to use an even number of braces 5 each having the same length, the setting angle α is determined depending upon the length L of the crane girder 2 prior to assembly. As a consequence, the lower chord 4 which serves as a rail and forms the running surface 4h for this purpose is reinforced to prevent warpage. However, it is fundamentally also feasible for the braces to have a different length and accordingly also for the setting angle α to have different values.

In the case of the paired, pitched-roof arrangement of the braces 5, in the region of one of the two ends of the crane girder 2 as seen in the longitudinal direction LR a first brace 5 is detachably fastened to the lower chord 4 by means of a lower screw connection 12 and a lower plug-in connection 13. Proceeding from this, the brace 5 extends in the longitudinal direction LR at the setting angle α in an inclined manner in the direction of the upper chord 3, to which the brace 5 is likewise detachably fastened by means of an upper screw connection 12 and an upper plug-in connection. In this case, the brace 5 is fastened with an upper first brace end 5e and a lower second brace end 5f so as to lie between and against mutually facing inner sides of the webs 3a, 4a of the upper chord 3 or the lower chord 4.

A first upper node region OK or a first lower node region UK is formed in each case in the webs 3a, 4a of the upper chord 3 or the lower chord 4 by means of the screw connection 12 and the plug-in connection 13, said node region being formed not in a point-shaped manner but rather in a line-shaped manner on the longitudinal sides of the main surface 5a of the brace 5.

Figure 3A:
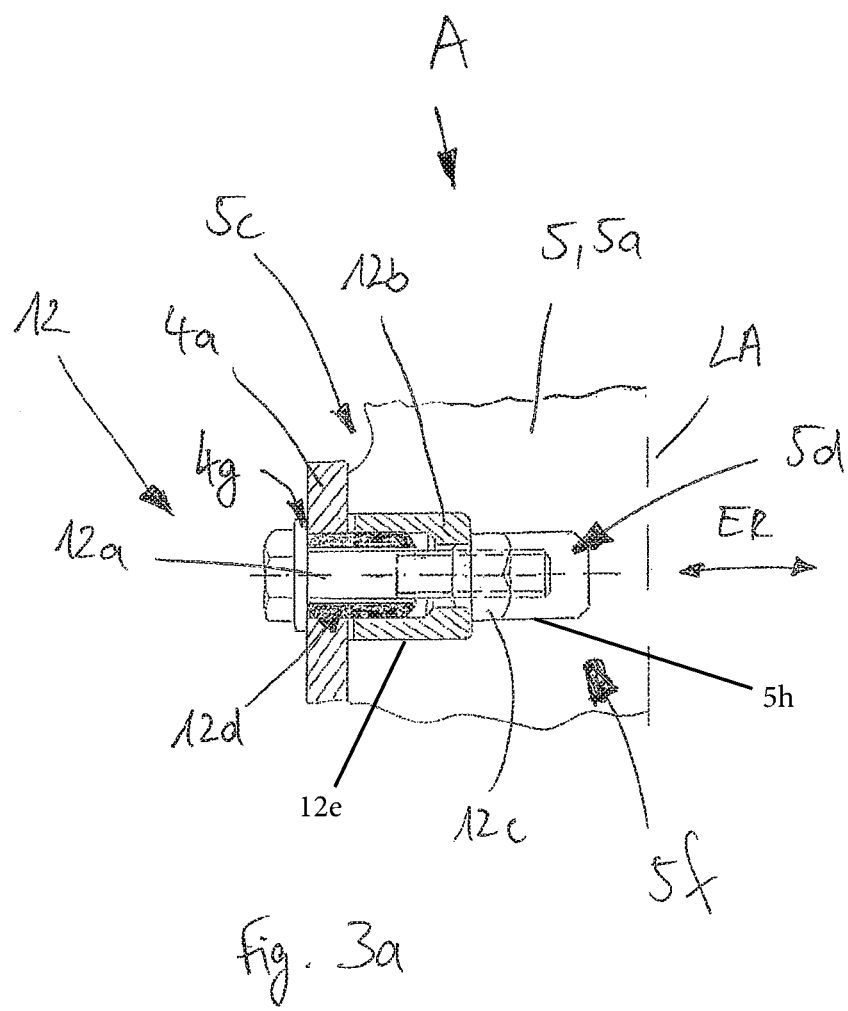
FIG. 3a shows a cross-sectional view of the detail A of FIG. 3.

The respective screw connection 12 and plug-in connection 13 and the production thereof will be described in detail hereinafter with reference to FIGS. 3, 3a and 4.

Adjoining in a second upper node region OK arranged next to the first upper node region OK is a second brace 5 which extends obliquely at the setting angle α downwards to the lower chord 4 and terminates a first pair of braces 5 arranged in pitched-roof fashion. Therefore, each brace 5 forms an identical setting angle α with the auxiliary plane or auxiliary line HL in the region of the corresponding upper node region OK on the upper chord 3. This is repeated until the braces 5 reach the opposite end of the crane girder 2. Optionally, a post 6 can be arranged in each case between two adjacent braces 5, in particular between the upper node regions OK of a pair of braces 5 or the lower node regions UK of two adjacent pairs of braces 5, and can be detachably fastened in the same manner as the braces 5.

FIG. 3 shows a cross-sectional view of the crane girder 2 shown in FIG. 2, the section of which extends transversely to the longitudinal direction LR and between two adjacent braces 5. The brace 5 which is illustrated by way of example in this cross-sectional view and is designed in a flattened manner comprises an elongate shape in the direction of a longitudinal axis LA and has a substantially rectangular main surface 5a. The brace 5 is formed symmetrically in relation to the longitudinal axis LA. In this case, the main surface 5a extends along the longitudinal axis LA of the brace 5 and in any case in a central region over at least half of a width B of the crane girder 2 transversely to the longitudinal direction LR of the crane girder 2. In this case, the width B corresponds to the distance between the points, which are outermost as seen in the longitudinal direction LR, of the lower chord 4, or, as in the case of the crane girder 2 shown in FIG. 3, of the upper chord 3, in particular the flanges 3c, 4c which are directed outwards away from the longitudinal axis LA.

The braces 5 are preferably produced by laser cutting from a steel sheet which forms the main surface 5a and the optionally provided secondary surfaces 5b. In the region of the mutually opposite brace ends 5e, 5f, two upper and two lower recesses 5c are provided on both longitudinal sides of the brace 5. The recesses 5c are formed in a circular manner, preferably in the form of a circular arc and, in terms of fastening the braces 5 to the upper chord 3 or the lower chord 4 of the crane girder 2, ensure that the force flow is optimised through the braces 5 and the screw connection 12 or the plug-in connection 13 is relieved. The recesses 5c produce in the region of each brace end 5e, 5f a constriction of the main surface 5a transversely to the longitudinal axis LA, whereby the brace 5 forms in each case a type of membrane joint in these regions.

Between the lower and upper recesses 5c, a secondary surface 5b which is folded, preferably folded at right-angles, and extends in parallel with the longitudinal axis LA adjoins the main surface 5a on each longitudinal side of the brace 5. The secondary surfaces 5b are substantially trapezoidal (see also FIG. 4). If the secondary surfaces 5b are both folded at right-angles in the same direction, as illustrated in the present figures, the brace 5 illustrated in FIG. 2 has, at least in the region of the secondary surfaces 5b, a U-shaped cross-section as seen in the direction of the longitudinal axis LA of the brace 5. It is likewise feasible for the secondary surfaces 5b to be folded in opposite directions, so that, as seen in the direction of the longitudinal axis LA, a Z-shaped cross-section would be produced at least partially. By omitting a secondary surface 5b or by providing only one single secondary surface 5b, the brace 5 can correspondingly also have an at least partial L-shaped cross-section in the direction of the longitudinal axis LA. The secondary surfaces 5b serve to increase the buckling strength of the braces 5. The secondary surfaces 5b are located outside of the webs 3a, 4a between the upper chord 3 and the lower chord 4, so that only regions of the longitudinal sides of the main surfaces 5a which are not folded back lie against the webs 3a, 4a, in particular against the mutually facing inner sides thereof. The membrane joints formed by the recesses 5c are thus arranged, as seen in the direction of the longitudinal axis LA, between the secondary surfaces 5b and the respective brace end 5e or 5f which is clamped between the webs 3a or 4a.

The screw connections 12 and plug-in connections 13 which are provided for fastening the brace 5 in each case to the upper chord 3 and the lower chord 4 are each designed in the same manner, for which reason the brace ends 5e, 5f, irrespective of different dimensions, are also designed in structural terms in a similar manner. The following statements in this respect relate therefore either to the fastening of the brace 5 to the upper chord 3 or to the fastening of the brace 5 to the lower chord 4 and can be applied accordingly to the respective other fastening of the brace 5.

In order to be able to fasten the brace 5 with the upper first brace end 5e between the two webs 3a to the upper chord 3 by means of the screw connection 12, two upper apertures 5d are provided between the upper first brace end 5e of the brace 5 and the upper recesses 5c in the metal sheet of the main surface 5a and are arranged on the right and left in relation to the longitudinal axis LA. The apertures 5d are designed as substantially rectangular slots which extend, proceeding from the longitudinal sides of the brace 5 which extend in parallel with the longitudinal axis LA, transversely thereto in the direction of the longitudinal axis LA and thus set the longitudinal sides back in the direction of the longitudinal axis LA.

Arranged in the region of each aperture 5d is a sleeve 12b, through which one screw 12a of the screw connection 12 is guided. In this case, the sleeve 12b is oriented with its sleeve longitudinal axis in parallel with the longitudinal extension of the aperture 5d and lies with its peripheral surface 12e against an edge 5h of the aperture 5d. For this purpose, the peripheral surface 12e of the sleeve 12b has a diameter which is less than the width of the aperture 5d measured in the direction of the longitudinal axis LA. Therefore, the sleeve 12b is arranged at least partially in the aperture 5d and protrudes into or through the plane formed by the main surface 5a. To ensure that the sleeve 12b is prevented from rotating about the sleeve longitudinal axis, the sleeve 12b is fastened to the main surface 5a, in particular to the edge of the aperture 5d. Preferably, the fastening is effected in an integrally bonded manner and in particular by means of a welded connection between the peripheral surface 12e of the sleeve 12b and the main surface 5a in the region of the edge 5h of the aperture 5d. Alternatively, soldered or adhesive connections are also feasible.

The described arrangement of the sleeve 12b in the aperture establishes for the screw 12a a screw-in direction ER which extends transversely to the longitudinal axis LA of the brace 5 and in parallel with its main surface 5a.

In order to fixedly clamp the brace 5 to the upper chord 3, the screw 12 is guided externally through a screw passage 3g, which is provided on the upper chord 3 or its web 3a, and through the sleeve 12b and is screwed in the screw-in direction ER to a nut 12c designed preferably as a press nut. In this case, the screws 12a are supported with their screw heads via the webs 3a on the upper chord 3. Within the aperture 5d, the nut 12c is supported on the sleeve 12b, in order to absorb the tightening torque for the screw 12a. As a consequence, the sleeve 12b and thus also the brace 5 are fixedly clamped to the upper chord 3. In order to absorb lateral forces or shear forces between the brace 5 or the sleeve 12c fastened thereto and the web 3a of the upper chord 3, the screw connection 12 comprises a sleeve-shaped clamping pin 12d (see FIG. 3a), through which the screw 12a is guided.

In FIG. 3, the lower screw connection 12 is denoted as detail A. FIG. 3a illustrates an enlarged cross-sectional view of detail A, in order thereby to demonstrate by way of example and in detail the basic design of all of the screw connections 12. The illustrated cross-section extends in parallel with the main surface 5a of the brace 5. FIG. 3a shows in particular the fastening of the lower second brace end 5f to one of the two webs 4a of the lower chord 4 by means of the lower screw connection 12. The figure illustrates one of the apertures 5d, against the edge 5h of which the peripheral surface 12e of the sleeve 12b lies and is welded. Also illustrated is the arrangement of the clamping pin 12d within the screw passage 4g and within the sleeve 12b. In this case, the sleeve 12b and the web 4a are supported via its screw passage 4g on the clamping pin 12d. The screw 12a is guided through the clamping pin 12d which extends in the screw-in direction ER.

FIG. 3 also shows that the upper first brace end 5e is fastened to the upper chord 3 not only by means of the screw connection 12 but also by means of the plug-in connection 13. The plug-in connection 13 is produced directly between the brace 5, in particular its main surface 5, and the upper chord 3, in particular its webs 3a. For this purpose, the main surface 5a forms on its longitudinal sides in each case a correspondingly laterally arranged plug-in shoulder 5g (see also FIG. 2), which extends outwards, preferably in a rectangular manner, in a manner directed away from the longitudinal axis LA. By reason of the wing-like arrangement of the plug-in shoulders 5g between the upper recesses 5c and the upper apertures 5d, the main surface 5a is formed in this region in an approximately T-shaped manner. In order to be able to produce the plug-in connection 13, a plug-in receiver 3f is provided in each case in the upper chord 3 or its webs 3a, the brace 5 being inserted with the plug-in shoulders 5g into said plug-in receiver. Accordingly, the plug-in receivers 3f are designed in the shape of slots and in a complementary manner to the plug-in shoulders 5g or the metal sheet cross-sections thereof. The slot-shaped plug-in receivers 3f are formed in the webs 3f in each case as elongate through-openings but can also be formed in a non-continuous manner and in the manner of a blind hole. Moreover, the plug-in receivers 3f are oriented in accordance with the setting angle α with respect to the auxiliary plane (see also FIG. 4), so that the plug-in receivers 3f each extend in parallel with the main surface 5a and preferably in a plane with the main surface 5a. By orienting the plug-in receivers 3f with regard to the setting angle α and their spacing from one another in the longitudinal direction LR, the fastening position of the braces 5 is fixed in this regard in rotational and translational terms. In order to fasten the brace 5 in a detachable manner to the upper chord 3, the upper first brace end 5e of the brace 5 and the upper chord profiles 3d, 3e are each moved towards one another in a plug-in direction SR such that the plug-in shoulders 5g are inserted into the associated plug-in receiver 3f of the corresponding upper chord profile 3d, 3e. In this case, the longitudinal sides of the main surface 5a, which extend in the longitudinal direction LA, lie both above and below the apertures 5d or the plug-in shoulders 5g against the inner sides of the webs 3a. The plug-in connection 13 produced in this manner produces a form-fitting connection or fastening acting transversely to the plug-in direction SR of the brace 5 to the upper chord 3, by means of which the position of the brace 5 is fixed according to the position and orientation of the plug-in receiver 3f in the fastening position. The form-fitting connection can then be released accordingly only by a movement of the brace 5 or the upper chord profiles 3d, 3e in the respectively opposite plug-in direction SR. In the present exemplified embodiment, the plug-in direction SR is identical to the screw-in direction ER, so that both lie in parallel with the plane of the main surface 5a and in this case the screw connections 12 and the plug-in connections 13 lie at least partially within the plane of the main surface 5a (see also FIG. 4).

In order to fasten the braces 5 to the lower chord 4, the lower second brace end 5f is likewise provided with a corresponding lower screw connection 12 and a lower plug-in connection 13. In relation to the longitudinal extension of the brace 5, the upper screw connection 12 and the lower plug-in connection 13 face towards the corresponding brace ends 5e, 5f and the lower screw connection 12 and the upper plug-in connection 13 are arranged therebetween. However, in the direction of the longitudinal axis LA, the screw connection 12 and the plug-in connection 13 can be arranged on the respective brace end 5e, 5f in any manner in relation to one another.

The brace 5 is fastened to the upper chord 3 in particular via the main surface 5a because the screw connection 12 and the plug-in connection 13 each incorporate the main surface 5a in the form of the apertures 5d and the plug-in shoulders 5g respectively and thus cooperate directly with the main surface 5a.

A method of assembling the previously described crane girder 2, in particular for detachably fastening the flattened braces 5 which connect the upper chord 3 to the lower chord 4 will be described hereinafter. In this case, in a first assembly step the braces 5 are moved in relation to the upper chord 3 and the lower chord 4 to a fastening position which includes the desired setting angle α of the braces 5 and their spacing in the longitudinal direction LR. In order to achieve the fastening position, in the first assembly step the braces 5 with their plug-in shoulders 5g and the plug-in receivers 3f, 4f, which are formed at the setting angle α, of the upper chord 3 and of the lower chord 4 are assembled together in the plug-in direction SR. Accordingly, the plug-in receivers 3f, 4f serve as a positioning aid when producing the respective plug-in connections 13, by means of which the fastening position is fixed in translational terms in the longitudinal direction LR and in terms of the setting angle α by reason of the above-described form-fitting connection. If the upper chord 3 or the lower chord 4 is composed in each case of two upper chord profiles 3d, 3e or of two lower chord profiles 4e, 4f, they are assembled together accordingly with the braces 5.

In a second assembly step, the crane girder 2 is then locked and fixed in the fastening position, produced in the first assembly step, also with regard to the insertion direction ER by means of two screw connections 12. In this case, two screws 12a of the upper screw connection 12 fixedly clamp the upper first brace end 5e to the upper chord 3, in particular between it two webs 3a, and two screws 12a of the lower screw connection 12 fixedly clamp the lower second brace end 5f to the lower chord 4, in particular between its two webs 4a. The upper and lower plug-in connections 13, as a positioning aid, not only fix the fastening position but in this case also relieve the rotationally fixed screw connections 12. However, by reason of the rotationally fixed screw connections 12 it is fundamentally also feasible, during assembly of the crane girder 12, to dispense with the plug-in connection 13 and to adjust and maintain the setting angle α merely by means of the screw connection 12.

FIG. 4 shows a side view of sections of the crane girder 2 shown in FIG. 2. Shown in the figure are the upper chord 3 and the lower chord 4 of the crane girder which are detachably connected to one another by means of the flattened braces 5. In particular, two pairs of the braces 5 which are arranged in pitched-roof fashion at the setting angle α with respect to the auxiliary line HL are illustrated in this case. The braces 5 of each pair are fastened to the upper chord 3 in each case by means of a screw connection 12 and a plug-in connection 13, with the formation of two upper node regions OK arranged next to one another. The screw heads of the screws 12a of the screw connections 12 which are guided through the respective screw passage 3g and are supported on the web 3a of the upper chord 3 can be seen. Also illustrated are the plug-in shoulders 5g formed by the main surface 5a which extends transversely to the longitudinal direction LR of the crane girder 2. In this case, the plug-in shoulders 5g are inserted through the plug-in receiver 3f provided in the illustrated web 3a of the upper chord 3.

Furthermore, the braces 5 of each pair are fastened to the lower chord 4 likewise in each case by means of a screw connection 12, which is arranged on the screw passages 4g, and a plug-in connection 13, with the formation of the lower node regions UK, FIG. 4 likewise illustrating the screw connections 12 and the plug-in connections 13.

FIG. 4 also clearly shows the trapezoidal formation of the secondary surfaces 5b of the braces 5 folded from the main surfaces 5a. The secondary surfaces 5b are arranged outside of the webs 3a, 4a of the upper and lower chords 3, 4 and extend in or in parallel with a vertical plane including the longitudinal direction LR of the crane girder 2. Lying in or at least in parallel with a plane, which is defined by the main surface 5a and is inclined transversely to the longitudinal direction LR and at the setting angle α with respect to the vertical auxiliary line HL, are the plug-in shoulders 5g, recesses 5c and apertures 5d, which are formed by the main surface 5a, the screws 12a of the screw connections 12, in particular their screw-in direction ER, and the plug-in direction SR of the plug-in connections 13 and the slot-shaped plug-in receivers 3f, 4g and the centre points of the screw passages 3g, 4g of the upper chord 3 or of the lower chord 4.

In one possible embodiment, the total length of a brace 5 is approximately 890 mm. In this case, the plug-in shoulders 5g are then each inserted with a plug-in width of approximately 25 mm, as measured in the direction of the longitudinal axis LA, into the plug-in receivers 3f, 4f of the upper and lower chords 3, 4. The maximum distance between the centres of the apertures 5d, which receive the screw connections 12, and the plug-in shoulders 5g is then approximately 35 mm in each case. The secondary surfaces 5b have, in relation to the longitudinal axis LA, a secondary surface length of 530 mm, i.e. the secondary surfaces 5b extend in their longitudinal direction over the secondary surface length of approximately 530 mm.

The secondary surface lengths are thus preferably in a range of about 40 percent to 70 percent, particularly preferably approximately 60 percent to 65 percent, of the total length of the brace 5. Starting from the end of the recess 5c facing in each case towards the brace end 5e or 5f, the length of the brace end 5e, 5f is in a range of about 10 percent to 15 percent of the total length of the brace 5. In relation to the total length of the brace 5, the length of the membrane joint in the region of the recesses 5c is preferably 5 percent to 10 percent, particularly preferably 8 percent.

The detachable connection of the braces 5 to the upper chord 3 and the lower chord 4 by means of the described screw connection 12 and the plug-in connection 13 is possible irrespective of whether the upper chord 3 or the lower chord 4 is composed of upper chord profiles 3d, 3e or lower chord profiles 4d, 4e or is designed as a one-piece flat profile 3b or flat profile 4b. Moreover, the screw connection 12 on the corresponding brace end 5e, 5f can also comprise merely one screw 12a and the plug-in connection 13 can also comprise merely one plug-in shoulder 5g.

In FIGS. 1 to 4, all of the braces 5 are designed in a flattened manner and are detachably fastened to the upper chord 3 and the lower chord 4, as described. However, it is also possible that not all of the braces 5 are detachably fastened and instead some of the braces 5 are non-detachably fastened, in particular by welding, to the upper chord 3 or the lower chord 4. Furthermore, it is feasible for not all of the braces 5, but instead only some of the braces 5, to be designed in a flattened manner. The same applies to optionally provided posts 6 which, however, are preferably arranged in the same manner as the braces 5 with their upper first post end 6e between the webs 3a of the upper chord 3 and are assembled together and screwed therewith. For this purpose, the posts 6 also have, on the longitudinal sides of their main surfaces 6a, corresponding apertures 6d and plug-in shoulders 6b.

It is fundamentally also feasible for bolt connections, which each comprise a bolt and at least one locking ring, to be used for detachably fastening the braces 5 to the upper chord 3 or the lower chord 4. The bolt connections can be provided in addition or in place of the screw connection 12 or the plug-in connection 13 and in this case can be connected in a corresponding manner to the braces 5, in particular via corresponding apertures 5d, to the upper chord 3 or to the lower chord 4.

LIST OF REFERENCE SIGNS 1 crane
2 crane girder
3 upper chord
3a web
3b flat profile
3c flange
3d first upper chord profile
3e second upper chord profile
3f plug-in receiver
3g screw passage
4 lower chord
4a web
4b flat profile
4c flange
4d first lower chord profile
4e second lower chord profile
4f plug-in receiver
4g screw passage
4h running surface
5 brace
5a main surface
5b secondary surface
5c recess
5d aperture
5e first brace end
5f second brace end
5g plug-in shoulder
6 post
6a main surface
6c recess
6d aperture
6e first post end
6f second post end
7 first running gear unit
7a first electric motor
8 second running gear unit
8a second electric motor
9 crane trolley
10 crane controller
11 pendant control switch
12 screw connection
12a screw
12b sleeve
12c nut
12d clamping pin 13 plug-in connection
α setting angle
A detail
B width
ER screw-in direction
F direction of travel
HL auxiliary plane
L length
LA longitudinal axis
LR longitudinal direction
OK upper node region
SR plug-in direction
UK lower node region

The invention claimed is:

1. A crane girder for a crane, said crane girder comprising:
a trussed girder with an upper chord, a lower chord, and braces connecting said upper and lower chords to one another;
wherein the crane girder is configured to support a movable crane trolley having a lifting gear;
wherein at least one of the braces comprises an at least partially flattened brace that has a flattened main surface that extends transversely to a longitudinal direction of the trussed girder; and
wherein the flattened brace is detachably fastened to at least one of the upper chord and the lower chord by means of a screw connection, and wherein the screw connection is arranged at least partially within a plane formed by the main surface of the brace, and wherein the screw connection has a screw-in direction in generally parallel alignment with the main surface.

2. The crane girder of claim 1, wherein the brace is detachably fastened to at least one of the upper chord and the lower chord via the main surface of the brace.

3. The crane girder of claim 1, wherein the brace is detachably fastened to at least one of a web of the upper chord and a web of the lower chord, and wherein the web that is fastened to the brace extends generally vertically in relation to the longitudinal direction of the trussed girder.

4. The crane girder of claim 1, wherein the brace is detachably fastened to at least one of the upper chord and the lower chord in at least one of a form-fitting and a force-fitting manner.

5. The crane girder of claim 1, wherein the screw connection comprises at least one screw, a sleeve fastened to the main surface of the brace, and a nut supported on the sleeve, and wherein the brace is detachably fastened to at least one of the upper chord and the lower chord by means of the screw passing through a screw passage of the upper chord or of the lower chord and the sleeve to engage the nut.

6. The crane girder of claim 5, wherein the screw connection comprises a clamping pin, and wherein the screw is guided through the clamping pin and the upper chord or the lower chord is supported on the clamping pin.

7. The crane girder of claim 5, wherein the main surface of the brace has at least one aperture, and wherein the peripheral surface of the sleeve lies and is fastened against the edge of the at least one aperture.

8. The crane girder of claim 1, wherein the brace is fastened by means of a plug-in connection.

9. The crane girder of claim 8, wherein the plug-in connection has a plug-in direction in generally parallel alignment with the main surface of the brace.

10. The crane girder of claim 9, wherein the plug-in connection is produced directly between the main surface and the upper chord or the lower chord, and wherein at least one plug-in shoulder of the main surface is inserted into a plug-in receiver of the upper chord or into a plug-in receiver of the lower chord.

11. The crane girder of claim 1, wherein the upper chord and the lower chord are additionally connected to one another by means of a plurality of posts arranged in the longitudinal direction of the trussed girder.

12. The crane girder of claim 1, wherein the upper chord and the lower chord are connected to one another exclusively in a detachable manner.

13. A crane, comprising:
at least one crane girder that is configured to extend horizontally in a longitudinal direction;
wherein the crane girder comprises an upper chord and a lower chord extending in generally parallel alignment in the longitudinal direction; and
wherein the crane girder comprises a plurality of braces connecting said upper and lower chords to one another;
wherein at least one of the braces comprises an at least partially flattened brace that has a flattened main surface that extends transversely to the longitudinal direction and is detachably fastened to at least one of the upper chord and the lower chord by means of a screw connection, and wherein the screw connection is arranged at least partially within a plane formed by the main surface of the brace, and wherein the screw connection has a screw-in direction in generally parallel alignment with the main surface.

14. The crane of claim 13, wherein the plurality of braces are detachably fastened to each of the upper chord and the lower chord.

15. The crane of claim 13, wherein the plurality of braces are each detachably fastened at opposing ends to a web of the upper chord and a web of the lower chord, and wherein the webs extend generally vertically in relation to the longitudinal direction.

16. The crane of claim 13, wherein the plurality of braces are each detachably fastened at opposing ends to the upper and lower chords via a screw connection, and wherein the screw connection comprises a screw and a sleeve welded, soldered, or adhered to the brace, and a screw passage at the respective upper or lower chord, and wherein the screw passes through the screw passage and the sleeve to form the screw connection.

17. A method of assembling a crane girder, said method comprising:
providing an upper chord, a lower chord, and braces configured to connect the upper and lower chords to one another, wherein at least one of the braces comprises an at least partially flattened brace that has a flattened main surface that extends transversely to a longitudinal direction of the girder;
orienting the braces relative to the upper chord and the lower chord to a fastening position that provides the desired setting angle of the braces relative to the upper and lower chords; and
detachably fastening the braces to the upper and lower chords to lock the braces in the fastening position by means of screw connections at each end of each of the braces, wherein the flattened brace is detachably fastened to at least one of the upper chord and the lower chord by means of the screw connection, and wherein the screw connection is arranged at least partially within a plane formed by the main surface of the brace, and wherein the screw connection has a screw-in direction in generally parallel alignment with the main surface.

18. The method of claim 17, wherein the screw connections each comprises a screw and a sleeve fastened to the respective brace, and a screw passage at the respective upper or lower chord, and wherein the screw passes through the screw passage and the sleeve to form the screw connection.

19. A crane girder for a crane, said crane comprising:
a trussed girder with an upper chord, a lower chord, and braces connecting said upper and lower chords to one another;
wherein at least one of the braces comprises an at least partially flattened brace that has a flattened main surface that extends transversely to a longitudinal direction of the trussed girder; and
wherein the flattened brace is detachably fastened to at least one of the upper chord and the lower chord by means of a screw connection;
wherein the screw connection is arranged at least partially within a plane formed by the main surface of the flattened brace, and wherein the screw connection has a screw-in direction in generally parallel alignment with the main surface.

20. The crane girder of claim 19, wherein the flattened brace is detachably fastened to at least one of the upper chord and the lower chord via the main surface of the flattened brace.

21. The crane girder of claim 19, wherein the flattened brace is detachably fastened to at least one of a web of the upper chord and a web of the lower chord, and wherein the web that is fastened to the flattened brace extends generally vertically in relation to the longitudinal direction of the trussed girder.

* * * * *